Dec. 31, 1935.  J. E. RHODES  2,025,898
ELECTRIC BROILER
Filed Nov. 20, 1934
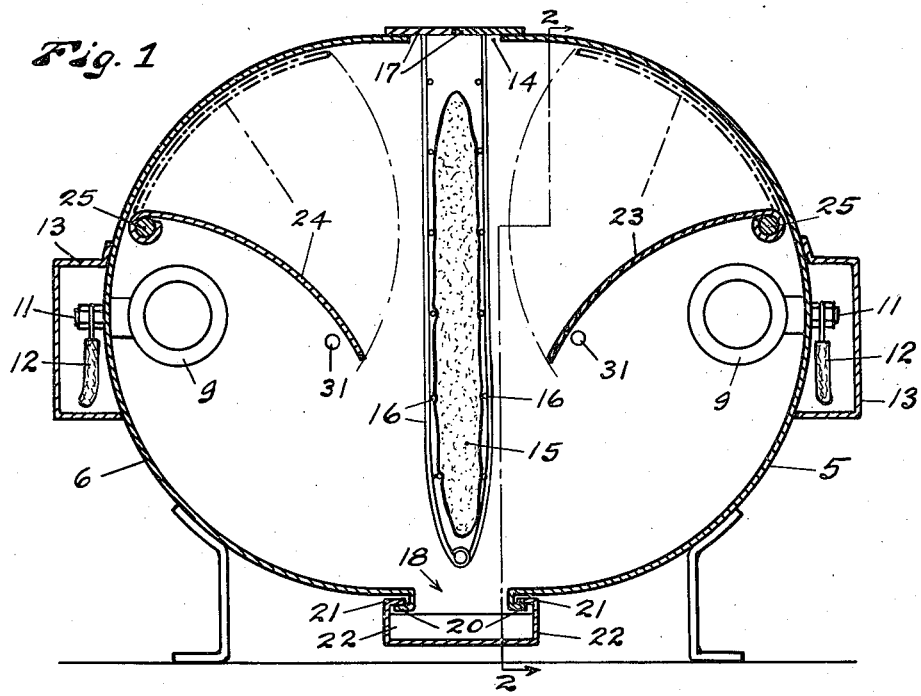
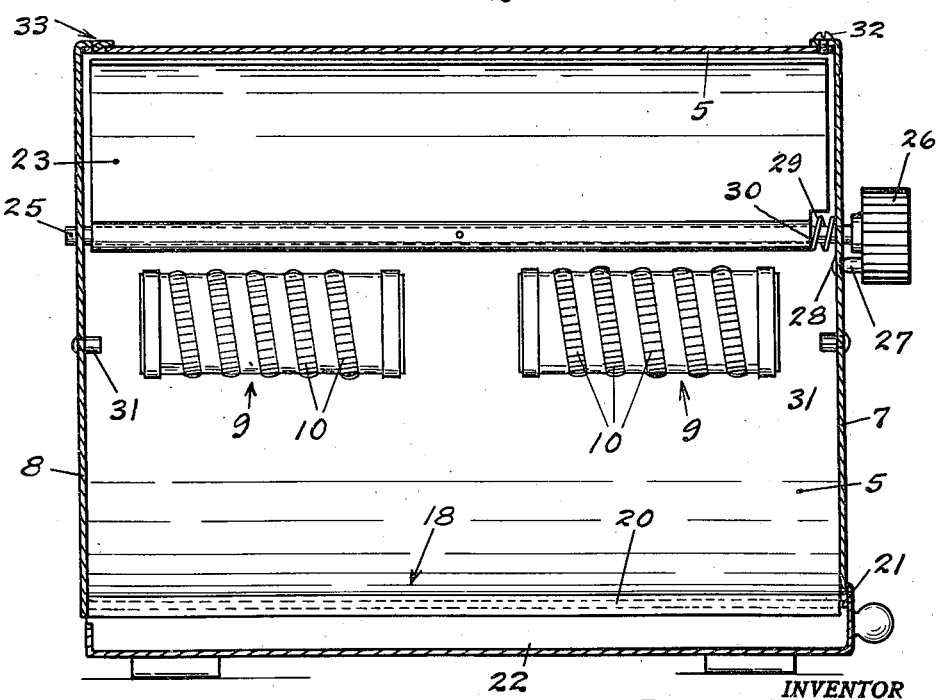
INVENTOR
John E. Rhodes
BY Fred C. Matheny
ATTORNEY Patented Dec. 31, 1935

2,025,898

UNITED STATES PATENT OFFICE 2,025,898

ELECTRIC BROILER

John E. Rhodes, Seattle, Wash.

Application November 20, 1934, Serial No. 753,870

2 Claims. (Cl. 219—34)

This invention relates to electric cookers and to methods of cooking meats and juicy foods without loss of juices. More particularly this invention relates to an electric broiler of a form capable of barbecuing or broiling meat, fish and like food by direct exposure to heat without loss of fats and juices from the food.

A primary object of this invention is to provide an electric broiler for cooking flat portions, as slices or cakes of meat or like juicy foods in a substantially upright position, said broiler having electric heating elements provided with heat control means which may be positioned so as to direct substantially all of the heat onto the lower portion of the cake or slice of food which is being broiled.

Another object of this invention is to provide a broiler of this nature in which the heat control means is in the form of a damper like member, pivoted for angular movement, adapted to serve as a heat deflector when in a lowered position and as a heat reflector when in a raised position, said damper like member, when raised being adapted to lie in close proximity to the main arcuate heat reflector of the broiler.

Another object of this invention is to provide a method of cooking a cake or piece of meat or like juicy food in a substantially upright position with a minimum loss of juice from said food, which method consists in first cooking the lower portion of such food with a relatively quick heat to sear the outside and form a coating thereon which will hold and retain the juices and then cooking the upper portions of the food in the usual manner allowing the juices, fats and liquefied portions of the food which tend to drain by gravity to be retained by the seared bottom portion of the piece of food.

In the broiling of meat, fish, game and like juicy foods in electric broilers, it is common practice to place a flat cake or piece of the food in a grill and broil the same while it is supported in a substantially upright position between heating elements. When this is done the juices and fats liberated and liquefied by the heat will tend to run down and drop out and some of the most desirable and savory portions of the food will be lost. In accordance with my method of broiling foods of this nature in substantially upright position, and by the use of my improved broiler, I first direct substantially all of the heat from the heating elements onto the lower portion of the food which is being broiled thereby quickly searing and forming a crust on the lower portion of said piece of food. This crust is formed quickly and very little of the juices and fats are lost in forming the same. After this crust is formed the upper portions of the piece of food may be subjected to a slower broiling or cooking process and the juices and fats which tend to run down will be caught and retained in the lower seared portion and will not be permitted to escape. In this way the desirable fats and juices and liquefied portions of the food will substantially all be conserved in the food and the quality of the final product improved.

One common fault found in electric broilers of the general type of my broiler is that the electric heating elements are too close to the food which is being cooked and when the broiler is used for broiling meats or like juicy or fatty foods the juices and fats will splash onto and come in direct contact with the electric heating elements thus causing rapid deterioration of said elements. In my broiler the heating elements are spaced far enough away from the food which is being cooked so that this objection is overcome and the electric heating elements safeguarded.

Other and more specific objects of this invention will be apparent from the following description taken in connection with the accompanying drawing.

In the drawing Figure 1, is a view in longitudinal section of an electric broiler constructed in accordance with my invention certain damper like heat deflectors being shown in lowered position.

Fig. 2 is a view partly in elevation and partly in section substantially on broken line 2—2 of Fig. 1, the damper like heat deflector being shown in a raised position in Fig. 2.

Like reference numerals designate like parts throughout the several views. Referring to the drawing 5 and 6 designate two substantially semi-cylindrical heat reflectors positioned in spaced apart opposed relation and connected with each other by side plate members 7 and 8.

Suitable electric heating elements 9 are provided in each heat reflector 5 and 6 preferably midway between the top and bottom thereof and in close proximity to the reflector. In practice I find it satisfactory to provide two of these electric heating elements within each reflector spaced apart as shown in Fig. 2 and having their resistance wires 10 connected with terminal posts or bolts 11 which extend directly outward through the heat reflector and are connected with circuit wires 12 by which electric current for heating purposes is supplied to the heating elements. Sheet metal housings 13 may be provided for the wires 12.

The heat reflectors 5 and 6 are positioned far enough apart to provide a transverse slot 14 on the top of the broiler through which flat cakes or pieces of food to be broiled may be inserted. This food is usually supported between two sides of a wire or open work grill. Fig. 1 shows a piece of food 15 supported between two sides or grids 16 of an open work grill. One or both of the grill sides 16 may be secured to flat members 17 which form a closure for the slot 14 in the top of the broiler and help to prevent loss of heat when the broiler is in operation and the grill is in place therein. As the construction of grills of this type is well known, my grill is not herein illustrated or described in detail.

A slot 18 is also provided in the bottom of the broiler for the discharge of products of condensation and such other liquid products as may result. The edges of the reflectors 5 and 6 at the location of the slot 18 are reversely bent outwardly as at 20 for engagement with the inwardly bent edges 21 of a catch pan 22 whereby the catch pan may be slid into liquid receiving position from one side of the broiler.

The heating elements 9 are positioned far enough away from the food which is being broiled so that substantially none of the fats or juices which are thrown off by the food due to the action of the heat will come in contact with said heating elements. For this reason there will be very little deterioration of the heating elements as contrasted with the deterioration which occurs if the heating elements are placed relatively close to the food.

For the purpose of directing substantially all of the heat from the heating elements 9 onto the lower portion of the food at the beginning of the cooking or broiling operation I provide two adjustable damper like heat deflectors 23 and 24. These deflectors 23 and 24 are curved to conform to the curvature of the reflectors 5 and 6 and are each mounted on pivot means 25 positioned a short distance above the heating elements and in close relation to the reflectors 5 and 6. When the deflectors 23 and 24 are turned down into the positions shown by full lines in Fig. 1 they will direct substantially all of the heat from the heating elements 9 onto the lower portion of the piece of food 15 which is supported in an upright position between the spaced apart heating elements 9 thus quickly searing the lower portion of said piece of food on both sides and forming a seal so that the juice and liquid fat can not escape. As soon as the lower portion of the upright piece of food has been thus seared the deflectors 23 and 24 are angularly moved upwardly until they lie substantially against the walls of the reflectors, as indicated by dot and dash lines in Fig. 1. When the deflectors 23 and 24 are in the raised position indicated by dot and dash lines in Fig. 1, they will lie closely against the reflectors 5 and 6 and will form a part of the heat reflecting surfaces which will cooperate in distributing and reflecting the heat from the heating elements 9 evenly against the piece of food 15. As the cooking of the piece of food is continued the parts which are liquefied by the heat will tend to run down toward the lower portion thereof but will be retained and prevented from escaping by the coating which has been formed by searing the exterior of the lower portion of said piece of food.

The pivot rods 25 may be journaled in the side plates 7 and a turn knob 26 or equivalent handle member is provided on at least one end of each pivot rod to facilitate proper positioning of the deflector plates 23 and 24. Suitable detent means is preferably provided in connection with each deflector 23 and 24 to hold the deflector in operative positions. One form of such detent means is shown in Fig. 2 in connection with heat deflector 23, it being understood that many different forms of detent means may be readily adapted to this use. In Fig. 2, I show a detent member 27 on the turn knob 26 adapted to engage within shallow recesses 28 in the side plate 7. Two of these shallow recesses are preferably provided, one for the lowermost and one for the uppermost position of the deflector plate. One resilient means for yieldingly holding the detent member 27 against the side plate 7 is shown in the nature of a compression spring 29 on the rod 25 between the inner surface of side plate 7 and a shoulder 30 on deflector plate 23. Positive stop members 31 may also be provided on one or both of the side plates 7 to positively prevent the deflector plates 23 and 24 from being brought down into contact with the heating elements.

The side plate 7 adjacent to which the turn knobs 26 are positioned is preferably secured to the reflector members 5 and 6 by screws 32. The opposite side plate 8 is preferably secured to the reflector members 5 and 6 by a more readily detachable means, as by spring catch members 32 leaving this side plate readily removable to afford access to the interior of the broiler for the purpose of cleaning.

When the heat deflector members 23 and 24 are raised into the dot and dash line position shown in Fig. 1, they occupy very little room and form a part of the reflectors reflecting the heat from heating elements 9 evenly against the upper portion of the food 15. When said heat deflectors 23 and 24 are lowered into the position shown by full lines in Fig. 1, they obstruct the passage of heat to the upper portion of the food 15 and deflect the major portion of the heat from the heating elements 9 against the lower portion of the food 15 thereby rapidly searing the lower portion of said food.

In cooking food in this broiler the preferred method of operation is to place the food in the broiler, turn on the high heat, position the deflectors 23 and 24 in the lower heat deflecting position until the lower portion of the food is well seared on the outside, then move the heat deflectors upwardly into the retracted position and allow the cooking of the food to continue with substantially evenly distributed heat.

The foregoing description and accompanying drawing clearly disclose a preferred embodiment of my invention but it will be understood that this disclosure is merely illustrative and that such changes in the invention may be made as are fairly within the scope and spirit of the following claims.

I claim:

1. In an electric cooker of the class described, a grill supporting a relatively flat piece of food in an upright position; a heating element positioned on each side of said grill; a heat reflector positioned back of each heating element; and a heat deflector pivotally mounted above each heating element movable into a retracted position clear of the path of heat between the heating element and the food in the grill or into a heat deflecting position deflecting the major portion of the heat from the element onto the lower portion of the food in the grill.

2. In an electric cooker of the class described, a grill supporting a relatively flat piece of food in a substantially upright position; two cylindrical reflectors positioned on opposite sides if said grill with their concave sides toward said grill; heating element means positioned within each of said reflectors at a substantial distance from said grill; a deflector member of substantially the same curvature as the reflectors pivotally mounted in each reflector above the heating element means, positioned to lie against the reflector when in retracted position; and stop means limiting the downward movement of each heat deflector to a heat deflecting position deflecting the major portion of the heat from said elements onto the lower portion of the food in the grill.

JOHN E. RHODES.